H. A. PAQUETTE.
COVER FOR COOKING UTENSILS.
APPLICATION FILED MAR. 21, 1913.
1,166,475.
Patented Jan. 4, 1916.
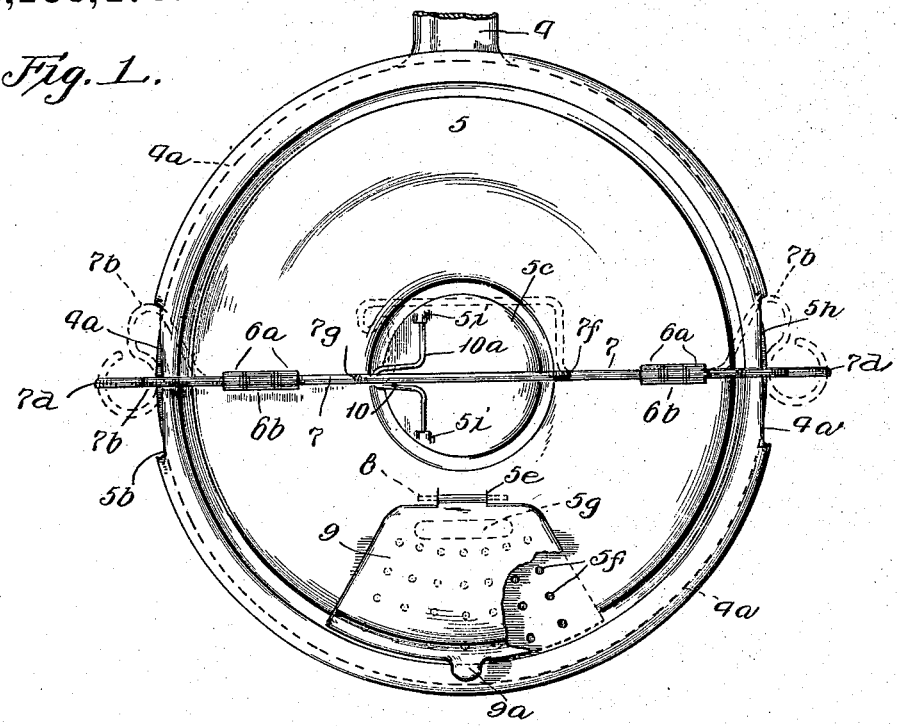
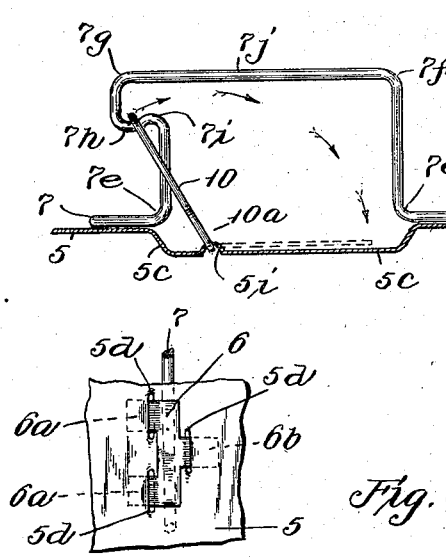
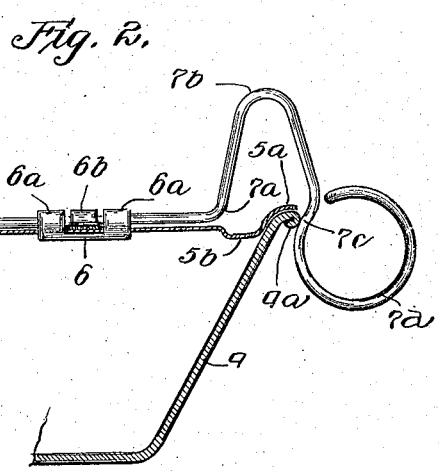
Witnesses:
Inventor:
Herman A. Paquette
by Frederick Benjamin
atty.

UNITED STATES PATENT OFFICE.

HERMAN A. PAQUETTE, OF CHICAGO, ILLINOIS.

COVER FOR COOKING UTENSILS.

1,166,475.  Specification of Letters Patent.  Patented Jan. 4, 1916.

Application filed March 21, 1913. Serial No. 755,887.

*To all whom it may concern:*

Be it known that I, HERMAN A. PAQUETTE, a citizen of the United States, residing at Chicago, in the county of Cook and State of Illinois, have invented certain new and useful Improvements in Covers for Cooking Utensils, of which the following is a specification.

My invention relates to improvements in culinary utensils, and more particularly to detachable lids or covers for such utensils.

The essential object of my invention is to provide a lid or cover adapted to form a tight joint with the beaded edge of a skillet, kettle, or similar utensil, and so constructed that it may be easily removed or applied.

A further object is to provide a cover with a combined handle and gripping attachment, so that when not in use, or when packed for shipment, said handle can be folded down adjacent said lid so that the complete device will not take up any more space than an ordinary cover.

A still further object is to provide a cover attaching device adapted to be detached by grasping it at either side or the center of the cover, and that will be held in place by tension exerted by integral portions of the device thus dispensing with springs.

I attain the above mentioned objects and others of general utility by the device illustrated in the accompanying drawings, in which:—

Figure 1 is a top plan view of my cover shown in operative attachment with a skillet, a portion of an auxiliary lid being broken away, dotted lines showing the position the handle takes when folded or in its inoperative position. Fig. 2 is an enlarged sectional front elevation of a portion of the handle shown in Fig. 1, portions of the skillet and cover being shown in cross-section. Fig. 3 is a fragmental view of a portion of the underside of the cover, the knuckles of the handle-connecting hinge being shown in flat position, that is, before they are bent upward and around the handle.

Similar reference characters refer to similar parts throughout the several views.

The reference character 4 designates a pan or skillet, with a beaded edge $4^a$. The cover 5 is substantially circular of the required shape to fit the top of said receptacle. The periphery $5^a$ of said cover is formed higher than the main portion and is curved to fit over said edge $4^a$. Adjacent the portion $5^a$ of the cover there is an annular depression $5^b$, which serves as a stiffening means for the cover, the central portion of the latter being depressed as at $5^c$.

Short slots $5^d$ are formed in the cover on opposite sides of the depression $5^c$, and are adapted to receive the tongues $6^a$ and $6^b$ of a hinge forming plate 6, as clearly shown in Fig. 3. Said tongues $6^a$ and $6^b$, after passing through said slots $5^d$, are bent upward and around adjacent portions of the wire member 7 which forms the handle and clamp for the cover.

Suitably hinged at $5^e$, by the pintle 8, is an auxiliary lid 9, which is adapted to cover perforations $5^f$, and a longitudinal slot $5^g$ formed in the cover 5 near the hinge of said lid. A lip $9^a$ on the front edge of said lid serves as a handle.

The cover attaching means consists of a single wire represented generally by the reference character 7. This wire extends parallel with the cover for portions of its length, on opposite sides of the central depression $5^c$, and is bent at its ends at $7^a$ upwardly to form loops $7^b$, thence downwardly and is bent again at $7^c$ to form eyes $7^d$, which constitute the terminals of the member, and are so arranged as to extend over and below the beaded edge $4^a$ of the receptacle, the bends $7^c$ forming inwardly extending shoulders which engage said edge at opposite points of the receptacle. Adjacent the depression $5^c$, the member 7 assumes a substantially U-shape, being bent upwardly at right-angles as at $7^e$, and back again at $7^f$, running parallel with the cover, and then downwardly at $7^g$, to form a bail or handle $7^j$. Between the bends $7^g$, $7^e$, and upon one leg of the U are two short bends or offsets $7^h$, $7^i$, which form a shoulder adapted to be engaged by a wire loop 10, the ends of which are pivotally connected with the cover 5, within the depression $5^c$, by ears $5^i$ struck up from the latter, said wire loop adapted to fold down and into said depression when not in operative engagement with said shoulder.

It will be evident from the above description that when the handle $7^j$ is in the upright position shown in Fig. 2, the cover will be in its locked and operative position, and the tension of the loop $7^b$ will hold the shoulders $7^c$ closely against the bead $4^a$. If the user pulls upwardly on the handle at $7^j$, the tension thus exerted will draw the said shoulders $7^c$ tighter against the bead $4^a$, but if the user pulls upwardly on either of the gripping eyes 7ᵈ, the tension at 7ᶜ will be released and the cover may then be easily disengaged and removed. The loop 10 serves as a support and latching means for the handle 7ʲ in its upright position, and when folded back as shown in dotted lines in Fig. 2, it will allow the handle to be turned on its hinges at 6 so as to lie against the surface of the cover 5.

Having thus described my invention, what I claim as new, is:—

A receptacle cover consisting of a metal disk, a handle therefor comprising a wire bent substantially U-shape mediate its ends, and having an offset and shoulder on one of the legs of the U, each respective end of said wire being bent to form a ring that is adapted to engage the rim of the receptacle, the portion of said wire adjacent said ring provided with a hump that rises above the plane of the upper segment of said ring, means for rotatably mounting said wire upon said disk at points mediate said hump and said U-shaped bend, and a link pivoted to said cover at right angles to said wire and adapted to engage said shoulder of the U-shaped member whereby the handle will be held in operative position.

In testimony whereof I affix my signature in the presence of two witnesses.

HERMAN A. PAQUETTE.

Witnesses:
G. W. HILTABRAND,
M. A. MILORD.

Copies of this patent may be obtained for five cents each, by addressing the "Commissioner of Patents, Washington, D. C."